United States Patent [19]

Lambert et al.

[11] Patent Number: 5,431,042
[45] Date of Patent: Jul. 11, 1995

[54] ENGINE EMISSIONS ANALYZER

[75] Inventors: David K. Lambert, Sterling Heights; Peter J. Groblicki, Shelby Township, both of Mich.

[73] Assignee: General Motors Corporation, Detroit, Mich.

[21] Appl. No.: 209,327

[22] Filed: Mar. 10, 1994

[51] Int. Cl.6 .................................. G01M 15/00
[52] U.S. Cl. ................... 73/116; 73/117.3; 73/23.31
[58] Field of Search ............ 73/117.3, 116, 23.31, 73/23.32; 123/674, 679, 685; 364/424.03, 431.03, 431.05, 431.1, 431.06

[56] References Cited

U.S. PATENT DOCUMENTS

| 3,406,562 | 10/1968 | Perna, Jr. et al. | 73/116 |
| 3,998,095 | 12/1976 | Tinkham et al. | 73/23.31 |
| 4,327,689 | 5/1982 | Rachel | 123/436 |
| 4,328,546 | 5/1982 | Kreft et al. | 73/116 |
| 4,638,658 | 1/1987 | Otobe | 73/117.3 |

FOREIGN PATENT DOCUMENTS

| 2752862 | 5/1979 | Germany | 73/117.3 |
| 3916467 | 11/1990 | Germany | 73/23.31 |

Primary Examiner—Richard E. Chilcot, Jr.
Assistant Examiner—James M. Olsen
Attorney, Agent, or Firm—Michael J. Bridges

[57] ABSTRACT

Internal combustion engine emissions information is generated by monitoring engine events that significantly impact engine emissions and by applying the monitored events to a model of the emissions impact of such events. The monitored events and the emissions impact derived from the model are made visible to the engine operator in a real-time format, and further may be made available to a third party for analysis.

18 Claims, 6 Drawing Sheets

ENGINE EMISSIONS ANALYZER

FIELD OF THE INVENTION

This invention relates to internal combustion engines of automotive vehicles and, more particularly, to a method for analyzing and communicating engine emissions information.

BACKGROUND OF THE INVENTION

Conventional automotive vehicle emissions control technology provides for significant internal combustion engine emissions reduction under a range of operating conditions. Nonetheless, vehicle or engine operators continue to be empowered to avoid operating the engine within such ranges. In some instances, avoiding operating in such ranges is discretionary, in that operators could, and indeed would take steps to operate within such operating ranges if given a meaningful choice. In other words, if engine operators were instructed as to the emissions impact of operating outside of such operating ranges, affirmative steps would be taken in response to the instruction to remain within the operating ranges when reasonably possible.

For example, the emissions penalty associated with an engine cold start is significantly higher than the penalty associated with an engine warm start. Furthermore, certain discretionary high performance modes of engine operation include an emissions penalty due to a requisite deviation from a beneficial commanded engine air/fuel ratio to an air/fuel ratio corresponding to increased performance, increased engine and catalytic converter protection, and to increased emissions levels.

While prior approaches to internal combustion engine emissions reduction have, to an extent, relied on an assumption that the engine operator would likely operate the engine in a range in which the conventional emissions control technology applied to the engine would provide a significant benefit in emissions reduction, no information is provided to the engine operator to indicate whether the engine is indeed being operated in such a range.

Some attempts have been made to sense engine emissions on-board automotive vehicles. For example, on-board sensors of the emissions elements of HC, CO, and NOx have been proposed to monitor engine emissions directly. However, the cost of such sensors and their reliability in the necessarily harsh environment in which they typically operate persist as barriers to their widespread use.

Furthermore, raw sensor information alone does not guide typical engine operators as to how to alter their driving behavior so as to improve engine emissions. Accordingly, it would be desirable to provide reliable information at low cost to the vehicle or engine operator or to a third party on whether the engine is being operated in a manner supportive of the emissions control technology provided therewith, so that corrective action may be taken when reasonably possible.

SUMMARY OF THE INVENTION

The present invention delivers the desired benefit by providing substantially real-time emission related information, a significant portion of which is presently available with conventional engine controllers, to the operator of an automotive vehicle or of an internal combustion engine whereby the operator may make a driving style adjustment to support the emissions reduction technology provided with the engine.

Specifically, presently available operating parameters that may define operating ranges in which the engine emissions reduction technology provides a significant emissions reduction benefit are monitored and logged, and are displayed to the engine operator in a substantially real-time format. In a further aspect of the invention, the logged parameters are periodically applied to a set of predetermined functions derived to map the logged parameters into real-time information on engine emissions, which likewise may be displayed to the engine operator, for example in a substantially real-time format. In yet a further aspect of this invention, the logged parameters may be downloaded to an off-board apparatus at prescribed time intervals for application to one or more models to derive engine emissions estimates for the time periods between such intervals.

The displayed, substantially real-time information on emissions impacting events, most of which is already available on the vehicle, may then be used by the emissions-aware operator to adjust driving style to minimize the time in which the engine is operated outside the appropriate ranges. As such, those discretionary engine maneuvers that may deviate the operating range outside the range within which the emissions control technology is most effective may be reduced or eliminated. Furthermore, periodic inspection of operator conformance to operation of the engine within such beneficial operating ranges may be monitored, and appropriate action taken.

BRIEF DESCRIPTION OF THE DRAWINGS

The invention may be best understood by reference to the preferred embodiment and to the drawings in which.

DESCRIPTION OF THE PREFERRED EMBODIMENTS

Figure 1:
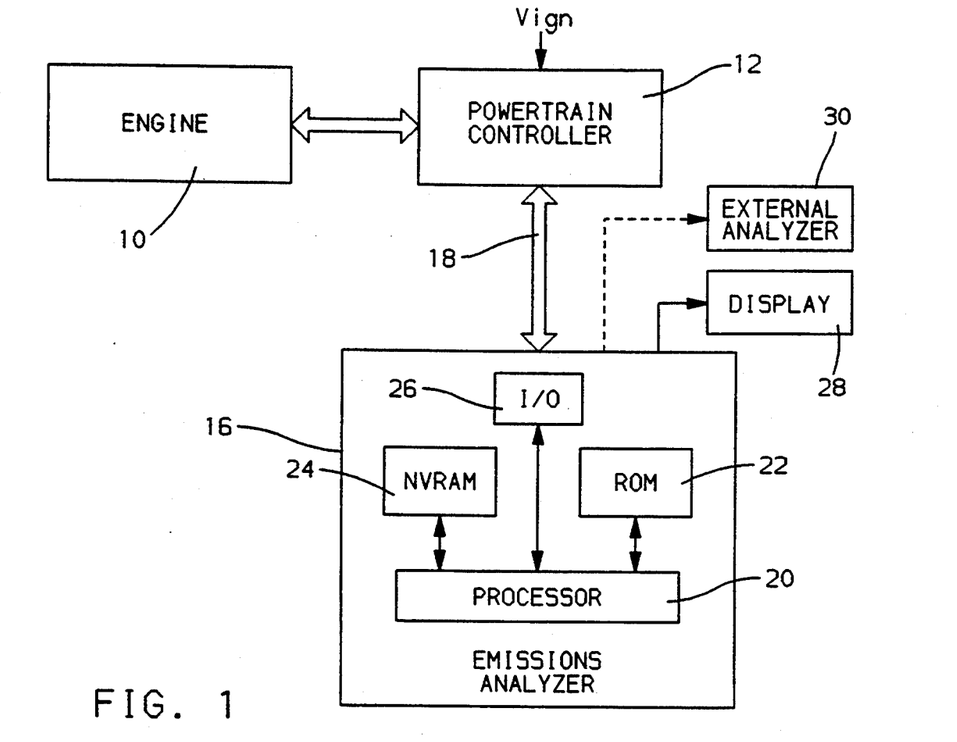
FIG. 1 is a general diagram of the engine hardware used in accord with a preferred embodiment of this invention.

Referring to FIG. 1, operating parameters corresponding to the operating conditions of an internal combustion engine 10 are communicated from a series of conventional engine parameter sensors (not shown) to a powertrain controller 12, which may be a conventional single chip microcontroller as is generally used in the art for powertrain control. The powertrain controller 12 is activated in response to application of ignition power thereto, such as when an engine operator rotates an ignition switch to its "on" position.

When activated, the powertrain controller 12 engages in control operations including reading of the described sensors and generating and issuing control commands in response thereto to various conventional powertrain control actuators (not shown). The controller 12 communicates with other external devices which, in this embodiment, include emissions analyzer 16 having a single chip microcontroller comprised of the generally known constituent elements of a processor 20, read only memory ROM 22, non-volatile random access memory NVRAM 24, and an input/output unit I/O 26.

Communication between the powertrain controller 12 and the emissions analyzer 16 may be carried out via conventional two-way communication link 18, which, for example, may be a bi-directional serial data link set up to communicate at 8192 baud in an eight bit format. Data passed from the powertrain controller 12 along the communication link 18 to the emissions analyzer 16 is passed to the I/O unit 26 thereof. Also connected to the emissions analyzer 16 via its I/O unit 26 is a display unit 28, which may be a data display suitable to be placed in a location visible to the operator of the engine, such as on the instrument panel of a vehicle in which the engine 10 is situated. Display data relating to engine emissions is generated in the emissions analyzer in response to information passed to the analyzer 16 from the powertrain controller 12, as will be described. The display data is periodically provided to update the display 28, so as to provide a substantially real-time display of emissions related information to the engine operator, as also will be described.

In an alternative embodiment within the scope of this invention, data generated and stored in the emissions analyzer 16 may be periodically downloaded via the I/O unit 26 to an external analyzer 30. The external analyzer may include means for receiving the downloaded data, for passing the data through a model developed to estimate emissions over a test period, and for communicating or displaying the emissions estimate. The inventors envision that such an external analyzer may be applied to monitor or regulate discretionary operator behavior that impacts engine emissions.

Figure 2:
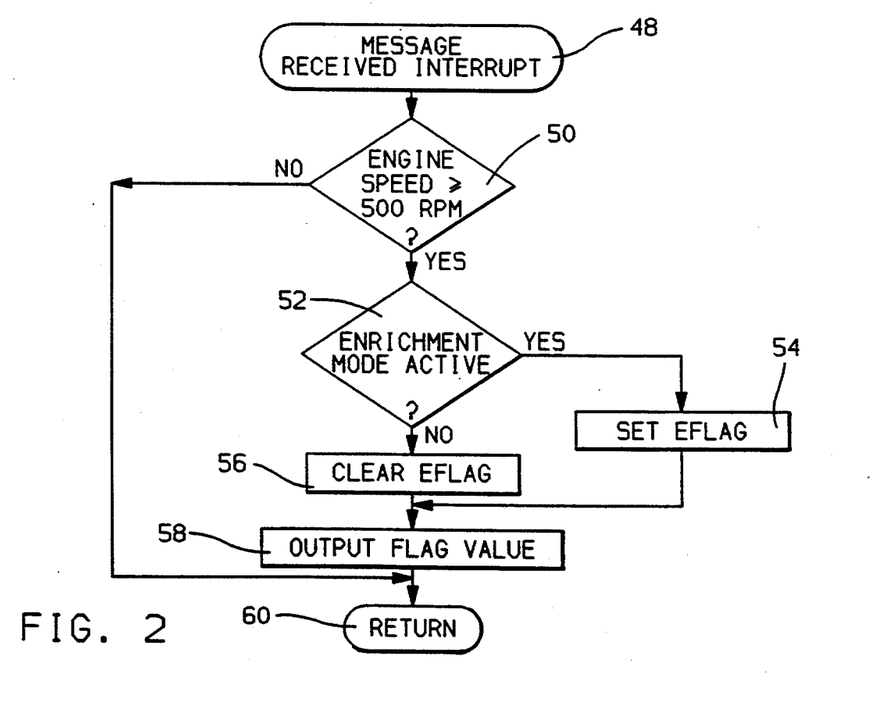
FIGS. 2, 3a, and 3b are computer flow diagrams illustrating the steps used to carry out the preferred embodiment of this invention.

Beyond the various conventional powertrain control, diagnostic and maintenance routines that may be periodically carried out by powertrain controller 12, the routine of FIG. 2 is intended to be executed upon receipt by the controller 12 of a message from the emissions analyzer 16 via communication link 18. Upon receipt of such information, an interrupt may be generated in the controller 12, which interrupt is serviced by the interrupt service routine of FIG. 2, starting at a step 48, and proceeding to a step 50, at which the speed of engine 10 (FIG. 1) is compared to a threshold speed, such a 500 r.p.m. in this embodiment. The threshold speed should be set to indicate whether the engine is running. If engine speed exceeds the threshold speed at the step 50, a response may be made to the message received from the emissions analyzer 16 (FIG. 1) by proceeding to steps 52–58 of FIG. 2. The emissions analyzer 16 will, in this embodiment, interpret the response as an indication that the engine is running, as will be described. Alternatively, if engine speed does not exceed the threshold speed at the step 50, no response is made to the received message, by proceeding directly to a step 60 of FIG. 2.

Specifically, if the engine is determined to be running at the step 50, the routine moves to a step 52, at which an appropriate powertrain control routine is interrogated to determine if the powertrain is being operated in an open-loop enrichment mode of air/fuel ratio control. In enrichment mode, an operator command or a high engine load requires, for improved engine performance or for engine or catalytic converter protection, a temporary departure away from the well-known closed-loop stoichiometric air/fuel ratio control. An emissions penalty is associated with the temporary departure. Operation in enrichment mode may be detected by determining if the commanded engine air/fuel ratio has deviated from the well-known stoichiometric air/fuel ratio while the engine is operating at high load.

If the powertrain is currently operating in enrichment mode, as determined at the step 52, the routine moves to a step 54 to set an enrichment flag EFLAG, and otherwise moves to a step 56 to clear EFLAG. After either of the step 54 or 56, the routine of FIG. 2 moves to a step 58, to output the flag value, whether set or clear, to the emissions analyzer via the communication link 18. Such communication may be in the 8192 baud, eight bit format previously described. After outputting the flag status at the step 58, or if the engine was determined to not be running at the step 50, the routine moves to a step 60 to return to any operations that were ongoing at the time of the described message received interrupt.

Figure 3A:
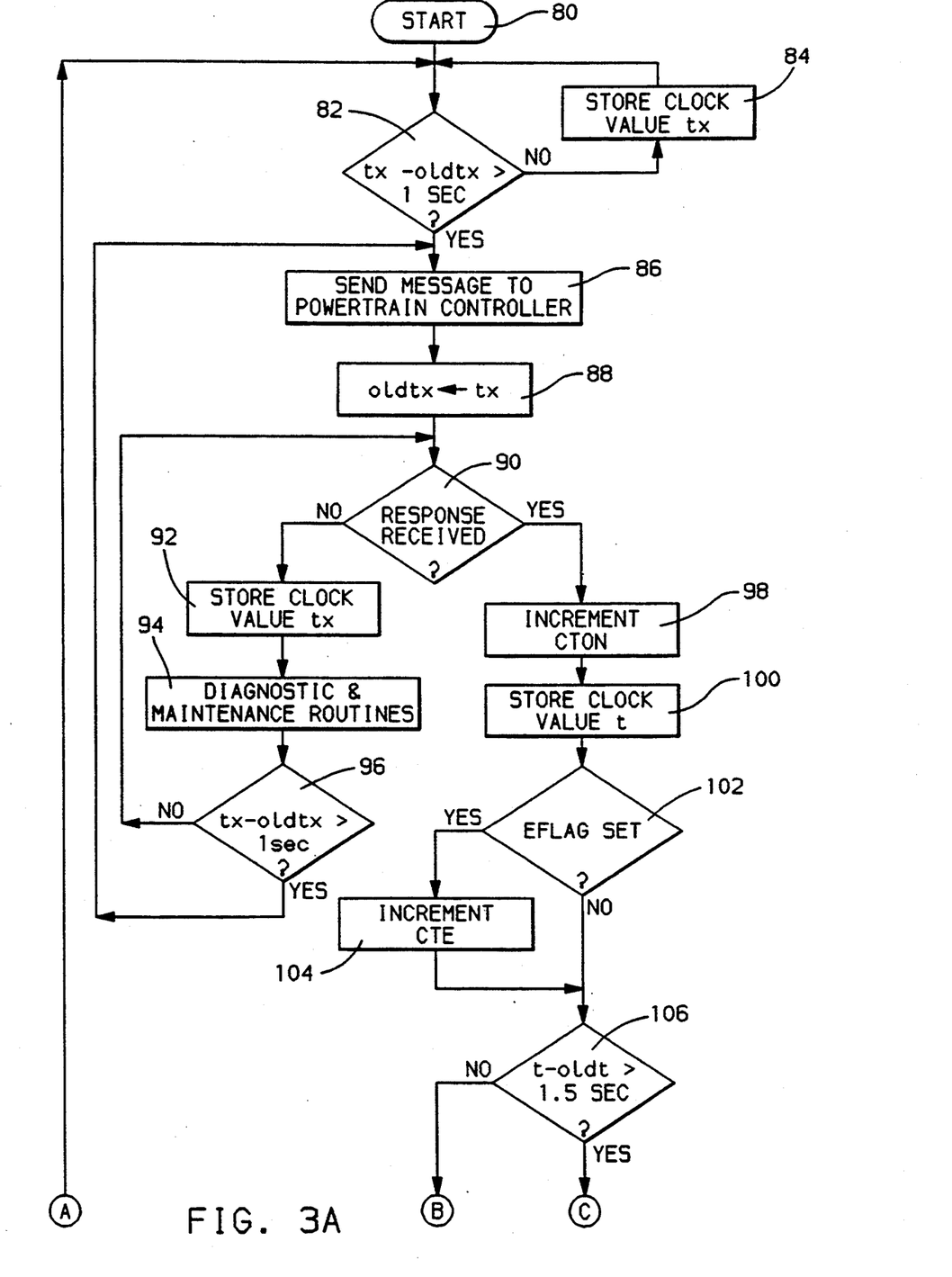
Figure 3B:
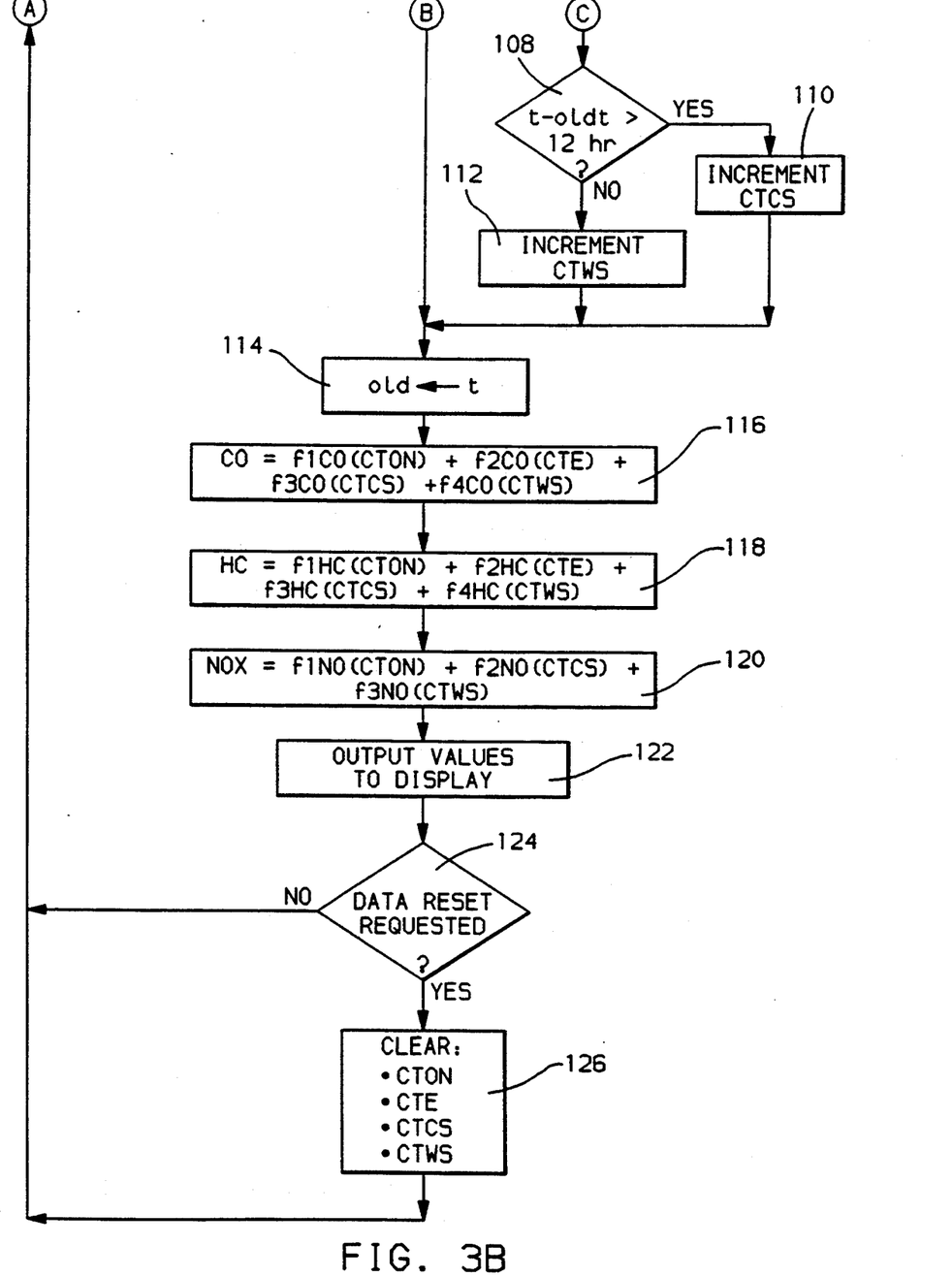

The emissions analysis operations carried out in the emissions analyzer 16 (FIG. 1) in accord with this embodiment of the invention are illustrated in FIGS. 3a and 3b and are entered at a step 80. It should be noted that the emissions analyzer 16 (FIG. 1) of this embodiment (and of the alternative embodiment hereof, to be described) need not rely on ignition power to remain active. Rather, the emissions analyzer 16 (FIG. 1) may remain active even when ignition power is not applied to the powertrain controller 12 (FIG. 1), so as to continue the operations of FIGS. 3a and 3b, to be described, while the operations of the powertrain controller 12 may not be ongoing.

Alternatively, the emissions analyzer 16 could be coupled to the powertrain controller 12 and only be active for periods in which the controller 12 is active. As will be made clear in this and in the alternative embodiments of this invention, the emissions analyzer need only be mechanized to be capable of periodically monitoring information from the powertrain controller 12 on engine activity relating to an estimate of engine emissions to be within the scope of the invention. Otherwise, and as will be made clear in the claims following this description, the inventors do not intend that this invention be limited to any specific mechanization.

Returning to the preferred embodiment hereof, the routine of FIGS. 3a and 3b is entered at the step 80, and proceeds to a step 82 to compare a time value tx to an old time value oldtx. If the difference between tx and oldtx is less than one second, then less than one second has elapsed since the execution of the routine of FIGS. 3a and 3b, and the routine moves to a step 84 to store the present clock value, such as may be read from a real time clock in the processor 20 (FIG. 1) of the emissions analyzer, as the updated time tx, and returns to again make the described comparison at the step 82. Once tx exceeds oldtx by at least one second at the step 82, the routine moves to a step 86, to begin execution of the remainder of FIGS. 3a and 3b, which is set up in this embodiment to repeat approximately once per second. At the step 86, a message is sent to the powertrain controller 12 (FIG. 1) requesting a response, as described in the FIG. 2. The message is transmitted to the controller 12 via communication link 18. The routine of FIGS. 3a and 3b then advances to a step 88 to store the most recent stored time tx as the old time oldtx, for use in timing the next iteration of this routine, and then moves to a step 90 to check for a response to the message.

If no response has been detected at the step 90, the routine moves to a step 92, to store the clock value as time tx, and then moves to a step 94, to execute any other operations that may be needed to properly operate the emissions analyzer 16, in accord with conventional processor operations, such as general diagnostic and maintenance operations. The routine then moves to a step 96, to compare the time tx to the old time oldtx that was updated at the step 88. If the difference between tx and oldtx is less than one second, the routine moves to the step 90 to continue to check for a response by the powertrain controller 12 (FIG. 1) to the sent message, and repeats the steps 90-96 in this manner until a response is received or until one second elapses.

When one second is determined to have elapsed at the step 96, the routine moves to a step 86, to send another message to the powertrain controller 12 (FIG. 1). The described process of sending messages to the powertrain controller 12 repeats approximately every second until a response is determined to have been received from the controller, at which time the step 90 proceeds to a step 98, to increment a counter CTON, which counts the number of responses received from the controller 12 as an indication of the number of one second samples of the controller in which the engine 10 was running and thus in which a response was provided by the controller 12, such as via the described routine of FIG. 2.

After incrementing CTON at the step 98, the routine moves to a step 100, to store the present processor clock value as time t, and then proceeds to a step 102, to analyze the received EFLAG value as communicated in the response from the powertrain controller 12, to determine any presence of information therein relating to engine emissions. For example, in this embodiment, the response is analyzed at the step 102 to determine if EFLAG is set indicating the engine is being operated in enrichment mode, as described in the routine of FIG. 2. If enrichment mode is indicated as active, the routine moves to a step 104, to increment counter CTE, indicating a one second engine operation sample in which enrichment mode is active.

The inventors intend that other engine operating conditions beyond the described enrichment mode may be communicated by powertrain controller 12 (FIG. 1) to emissions analyzer 16 and a count may be made of the number of samples in which such conditions were detected, as is done in this embodiment for enrichment mode. The emissions impact may then be estimated and included in a model, to be described, which transforms engine event information into an engine emissions estimate.

After incrementing CTE, or if EFLAG was determined to not be set at the step 102, the routine moves to steps 106-112, to determine whether a warm start or a cold start has occurred since the prior iteration of the present routine. Specifically, the routine moves to a step 106, to compare the most recent stored time t to the time oldt which is the time of the most recent received response from the powertrain controller 12 (FIG. 1). If the difference between t and oldt exceeds approximately 1.5 seconds in this embodiment, then it is assumed that the engine was just started.

Responses should be received approximately every second if the powertrain controller 12 is active, as a relatively small delay (substantially less than 0.5 seconds) is assumed to normally occur between the time a message is sent to the powertrain controller 12 and the time a response from the active controller is received. If, at step 106, the engine is determined to have just been started, the routine of FIGS. 3a and 3b proceeds to determine whether the start was a warm start or a cold start at a step 108, at which the difference between t and oldt is compared to a reference time, such as approximately twelve hours in this embodiment.

The reference time of twelve hours corresponds to the amount of time selected in this embodiment to transform a relatively low emissions warm start into a much higher emissions cold start. For example, the cold start may correspond to a catalytic converter that has, through cooling occurring during a time in which the engine 10 is not active, become catalytically inactive, wherein the engine emissions are significantly higher until the catalyst in the converter sufficiently heats up, from a transfer of heat energy from engine exhaust gas, to its light off temperature at which conversion of the exhaust gas constituent elements of HC, CO, and NOx may occur.

Returning to the step 108, if the difference between t and oldt exceeds approximately twelve hours, a cold start is assumed to have occurred, and the routine moves to a step 110 to record the cold start by incrementing a cold start counter CTCS. Alternatively, if the time difference does not exceed twelve hours at the step 108, a warm start is assumed to have occurred, and the routine moves to a step 112 to record the warm start by incrementing a warm start counter CTWS, which stores a count of the number of warm starts over a period of time. As described, cold starts may be generalized as producing more significant engine emissions for a short time after startup than do warm starts, as warm starts generally correspond to emissions control hardware that may rapidly become efficient in reducing emissions.

After characterizing the engine startup as either a cold start or a warm start, and incrementing the appropriate counter at either step 110 or 112, or if an engine start was not detected at the step 106, the routine of FIG. 3b proceeds to a step 114, to store the most recent read time t as oldt, for use in the next iteration of the present routine, and then proceeds to steps 116-120, to generate emissions estimates for the counted events as recorded in counters CTON, CTE, CTCS, and CTWS. The emissions estimates in this embodiment are for the constituent elements of carbon monoxide CO, hydrocarbons HC, and oxides of nitrogen NOx. Other emissions elements may be estimated within the scope of this invention, such as may be found in other internal combustion engine applications, for example carbon dioxide $CO_2$ emissions or emissions recognized generally in diesel engine applications.

The emissions estimates of this embodiment rely on a set of functions which may be periodically updated to closely correspond to the emissions behavior of the engine to which they are applied. Furthermore, the functions may be engine specific or engine class specific. Still further, the functions may be age specific, wherein as the engine and its particular emissions control hardware ages, the functions may be updated to attempt to portray the emissions behavior of the aging emissions producing and controlling systems.

Specifically, at a step 116, a linear function maps the four emissions impacting events counted in the routine of FIGS. 3a and 3b into an estimate of CO as follows:

$$CO = f1CO(CTON) + f2CO(CTE) + f3CO(CTCS) + f4CO(CTWS)$$

in which the function f1CO( ) maps the counted number of one second samples in which the engine was running into an estimate of CO. f1CO( ) may be generated by monitoring the level of CO emissions per second of normal operation of the engine 10 of this embodiment. The function f2CO( ) maps the counted number of one second samples in which enrichment mode was active into an estimate of CO, and may be generated by measuring the CO emissions level per second of operation of the engine 10 of this embodiment while such engine is operated in enrichment mode or a like operating mode.

The function f3CO( ) maps the counted number of cold starts into an estimate of CO, and may be determined by measuring the increase in CO over normal CO levels during a single representative cold start, up to the time the engine returns to CO emission levels corresponding to a fully warmed up functional emissions control system. The function f3CO( ) should be developed with consideration to the function f1CO( ) in that when combined, the two should model the total emissions behavior for an engine operating cycle that began with a cold start.

The function f4CO( ) maps the counted number of warm starts into an estimate of CO, and may be determined by measuring the increase in CO over normal CO levels during a single representative warm start and up to the time at which the engine returns to emissions levels corresponding to a fully warmed up functional emissions control system. As was the case for f3CO( ), the function f4CO( ) should be developed with consideration to the function f1CO( ), in that when combined, f4CO( ) and f1CO( ) represent generally the total engine emissions for an engine operating cycle that began with a warm start.

The four functions f1CO( ), f2CO( ), f3CO( ), and f4CO( ) may reflect a statistical relationship between the counted events and emissions estimates rather than a deterministic relationship. For example, a multiplicitive coefficient could be applied to each of the event counts to derive an emissions estimate, wherein the coefficients are provided from publicly available models of vehicle emissions behavior. The models may apply to a specific engine or vehicle or to an entire class of engines or vehicles. A preferred model in this embodiment is the generally-available California EFMAC model, which may be used to transform the counted event into emissions estimates.

After generating the values for the four CO functions shown at the step 116, and combining them to form a total CO estimate, the routine moves to a step 118, to carry out the same estimation for the emissions element HC. Specifically, four functions f1HC( ), f2HC( ), f3HC( ), and f4HC( ) are generated for mapping the four counted events, CTON, CTE, CTCS, and CTWS, respectively, into estimates of how such counted events may each have contributed to the total HC emissions level for the engine 10 of this embodiment.

The four estimates are combined to update the value HC at the step 118. The four functions may reflect a statistical rather than a deterministic relationship between the counted events and the emissions estimates, such as in the manner previously described for the CO estimate. The routine then moves to a step 120 to carry out an estimate of NOx emission levels, using three functions f1NO( ), f2NO( ), and f3NO( ), which map the counts CTON, CTCS, and CTWS, respectively, into three estimates of how such counted events impact NOx emissions for the engine 10 of this embodiment.

The count CTE of enrichment events was determined to not significantly impact emission levels of NOX in this embodiment, and thus was not included in the estimation of step 120. The four NO functions may reflect a statistical rather than a deterministic relationship between the counted events and the NOx estimate, such as in the manner described above for the CO estimate. After generating the three estimates at the step 120, they are combined to form the overall estimate value NOX.

As described, other counts of emissions impacting engine events may be included in alternative embodiments within the scope of this invention to improve the emissions estimates yielded through this invention. The four events of this embodiment were selected as they each contribute significantly to engine emissions and the counting of such events requires no additional sensing or processing hardware on the engine 10 (FIG. 1), on the powertrain controller 12, or on the emissions analyzer 16.

The inventors further intend that the functions used to transform the counted events into emissions estimates may vary with time or number of events, or may be periodically updated by authorized personnel. Such variation in the functions may attempt to model the evolving performance of the engine 10 (FIG. 1) or of the emissions control system, to properly characterize any changes in the relationship between the counted events and the emissions levels being estimated therewith.

Figure 5:
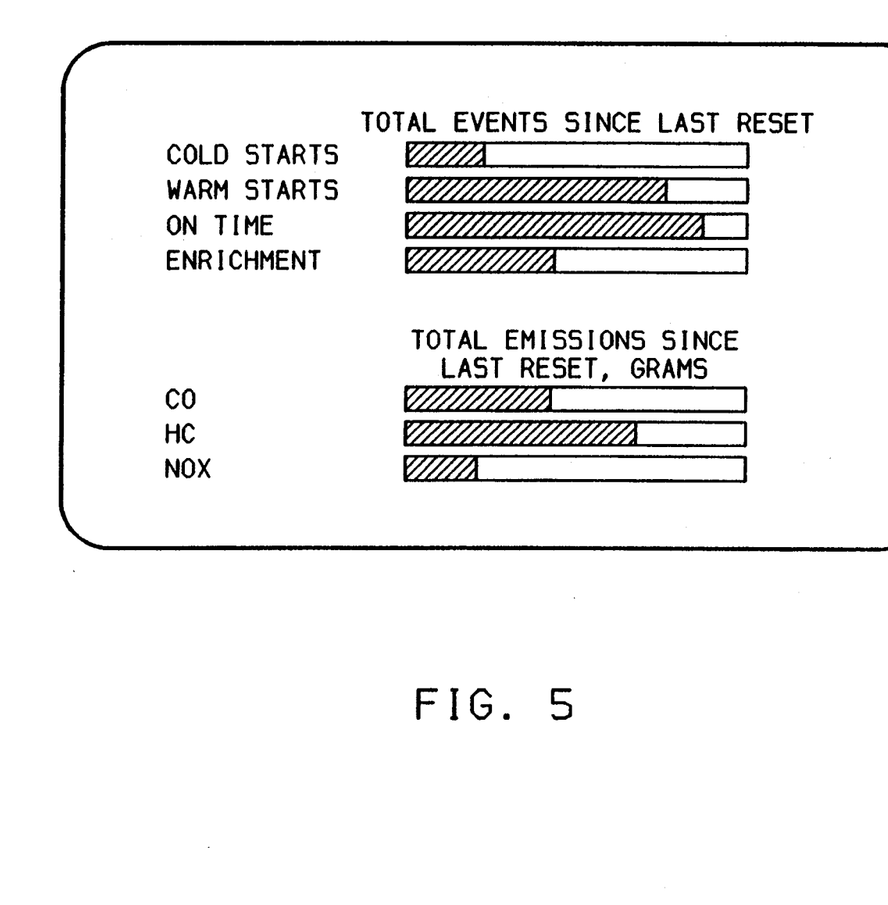
FIG. 5 is a diagram of the substantially real-time display format that may be used in accord with the preferred embodiment of this invention.

After generating the three estimated values at the step 116-120, the routine of FIGS. 3a and 3b proceeds to a step 122, to output the values to a display, such as the display 28 in FIG. 1. An example of a display format is shown in FIG. 5, in which both the counted events and the emissions estimates are displayed. According to the specific routine of FIGS. 3a and 3b of this embodiment, the display will be updated approximately once per second while ignition power is applied to the engine 10. Accordingly, the engine operator is given substantially real-time information on his driving behavior over a test period, and a substantially real-time estimate of the emissions impact of that behavior. The operator then has information with which informed decisions may be made on driving style.

Referring to the display shown in FIG. 5, which may be located so as to be visible to the engine operator, such as on an instrument panel of an automotive vehicle in which the engine 10 (FIG. 1) is installed, an upper display portion includes a display of the emissions impacting events described in this embodiment, and a lower display portion includes a display of emissions estimates corresponding to those displayed events. The display of FIG. 5 shows total event counts for each event, and shows total mass of emissions for each of CO, HC, and NOx, which may be given in grams or some other reasonable unit.

The inventors intend that the display of the information generated in accord with this invention may take many forms within the scope of this invention. For example, event counts may be displayed for each day, week, month, etc. or any combination of reasonable time periods. Further, a daily, weekly, monthly etc. average may also be displayed, and each event or emissions count may be displayed in a different color to make the display more readable to the operator. The display could be configured to vary in color or intensity as some predetermined function of the event counts or of the emission levels. Furthermore, the inventors intend that the wide variety of conventional display techniques such as analog or digital display techniques be included within the scope of this invention, as would be generally known in the art and an obvious substitution for the display examples described herein.

Additionally, the inventors intend that, rather than merely displaying the information on emissions impacting events, such as the four of this embodiment and the estimated emissions resulting therefrom, other useful information may be included in the display within the scope of this invention. For example, if a cost is associated with the emission of certain levels of pollutants, the cost could be included in the display, or a special indication could be made on the display when the estimated emission level of any pollutant exceeded some prescribed limit or some predetermined cost.

Returning to FIG. 3b, after communicating at the step 122 to update information to the display, such as the display of FIG. 5, the routine moves to a step 124, to determine whether a data reset has been requested since the last execution of the step 124. A data reset request may be provided manually from the engine operator, such as by engaging a switch (not shown) or depressing a button (not shown) located near the display 28 of FIG. 1. The request would indicate that the engine operator wants to clear old display information and to start accumulating new information on the events and their emissions impact. Accordingly, if such a request is detected at the step 124, the routine moves to a step 126 to clear (set to zero) the values for CTON, CTE, CTCS, and CTWS. The values of CO, HC, and NOX will be cleared after the cleared count values are processed on the next execution of the steps 116–120 of FIG. 3b.

Next, or if a data reset request was not detected at the step 124, the routine returns to the step 80 to begin another execution of the described routine of FIGS. 3a and 3b. Such repetition will continue while vehicle battery power is applied to the emissions analyzer 16 of this embodiment.

Figure 4A:
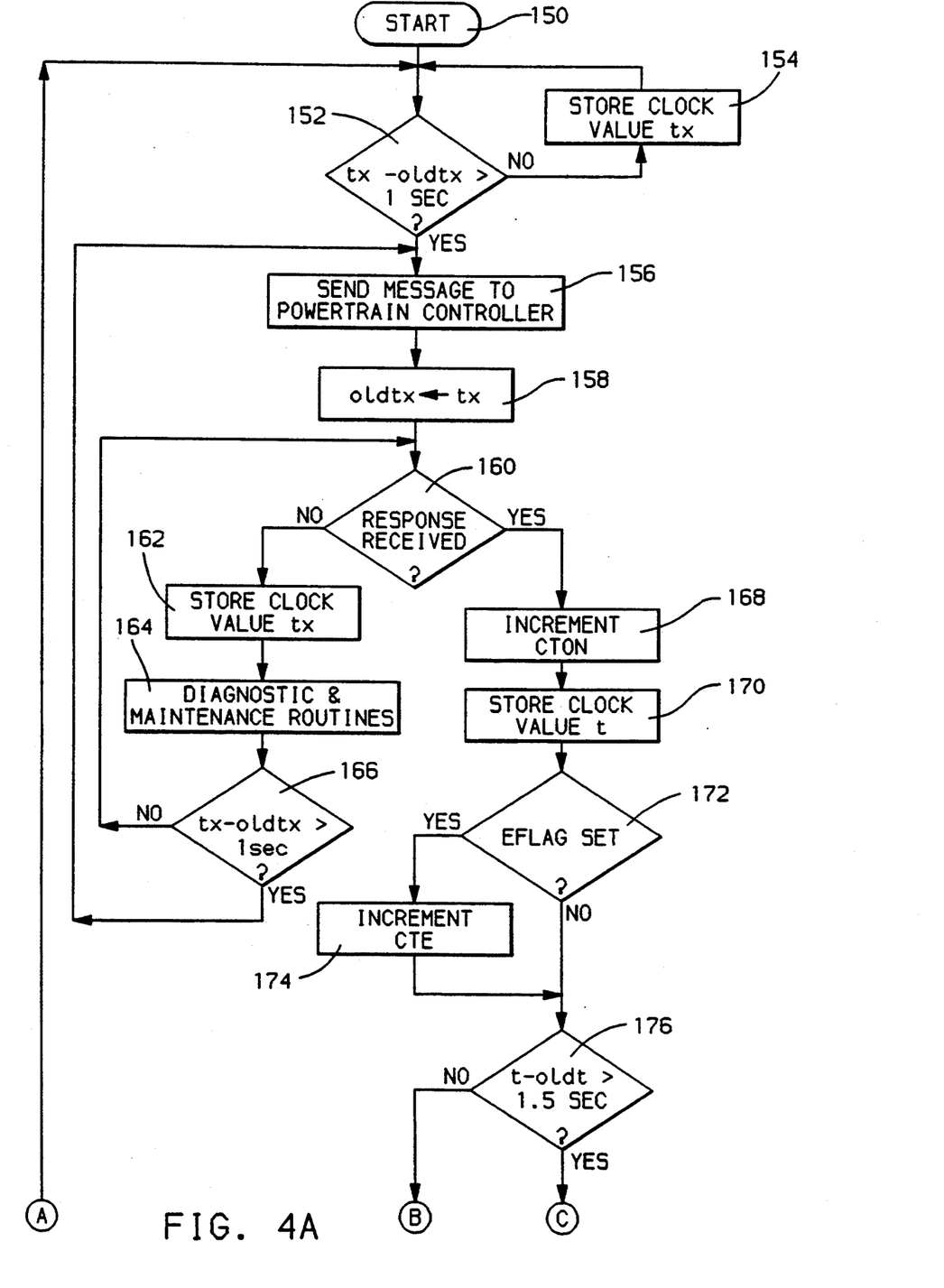
FIGS. 4a and 4b are computer flow diagrams illustrating the steps used together with those of FIG. 2 to carry out an alternative embodiment of this invention.
Figure 4B:
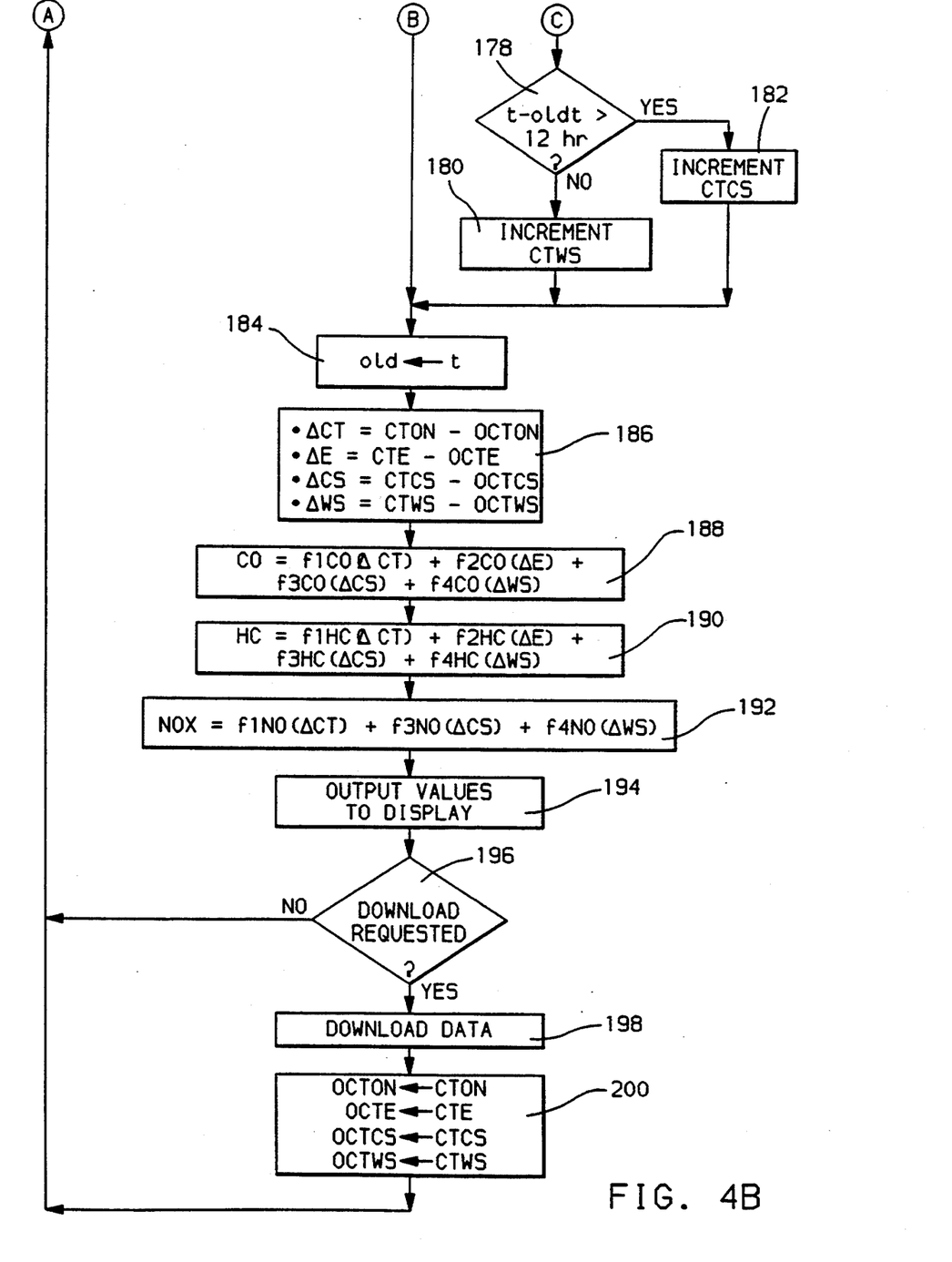

Turning to FIGS. 4a and 4b, a diagram of the steps executed by emissions analyzer 16 (FIG. 1) in accord with an alternative embodiment within the scope of this invention is shown. In this embodiment, the accumulated data on emissions impacting events and the estimates of engine emissions are not only made available for display to the engine operator so that prudent driving behavior adjustments may be voluntarily made, but the data is made available for download to an external analyzer, for analysis by a third party, as described for the external analyzer 30 of FIG. 1.

Turning to the specific steps of the routine of FIGS. 4a and 4b, the routine is entered at a step 150, and proceeds to steps 152 and 154 to delay until one second has elapsed since the last full execution of this routine, wherein the delay may be carried out as described for the like steps of FIGS. 3a and 3b. After one second is detected as having elapsed, the routine moves to the steps 156–184 to carry out steps as described in the embodiment of FIGS. 3a and 3b. Generally, a message is sent to the powertrain controller 12 (FIG. 1) at a step 156, the old time oldtx is updated with the more recent read time tx at a step 158, and the routine waits for a response at a step 160. If no response is received, time tx is updated at a step 162, general diagnostic and maintenance routines may be executed at a step 164, and a step 166 compares tx to oldtx, to determine if a second has elapsed since the last message has been sent to the powertrain controller 12 (FIG. 1). If one second has elapsed, a new message is sent at the step 156, and the wait for a response continues, as described. However, if one second has not elapsed, the routine moves to a step 160 to continue to wait for a response. Once a response is detected as being received, the step 160 proceeds to process the response at the steps 168–184. These steps correspond to those described as steps 98–114 of the embodiment of FIGS. 3a and 3b.

Specifically, CTON is incremented at a step 168, and clock value t is updated at a step 170. If the response included an indication that enrichment mode was active as determined at the next step 172, CTE is incremented at a step 174. Next, or if enrichment mode is not determined to be active at the step 172, the routine moves to a step 176, to determine if the response took more than approximately 1.5 seconds to arrive, indicating an engine startup. If an engine startup is so indicated at the step 176, the routine moves to a step 178, to determine if the startup was a cold start, requiring more than twelve hours of delay between the present and the most recent last received response. If a cold start is determined to have occurred, the routine increments CTCS at the step 182, and if a warm start is determined to have occurred, the routine moves to a step 180, to increment CTWS. After incrementing the appropriate counter at the step 182 or the step 180, or if an engine startup was not detected at the step 176, the routine moves to a step 184, to store the response received time t as oldt, for the next execution of the present routine.

After processing the received response, the routine of FIGS. 4a and 4b proceeds to a step 186, to generate delta values corresponding to the difference in emission impacting event counts from a set of initial counts. Specifically, ΔCT is the difference between CTON and an old engine operating count OCTON. ΔE is generated as the difference between CTE and an old engine enrichment count OCTE. ΔCS is determined as the difference between CTCS and an old engine cold start count OCTCS. ΔWS is generated as the difference between CTWS and an old engine warm start count OCTWS. The old values used in generating the delta values at the step 186 are the four total count values saved after the most recent data download, as will be described.

After generating the delta values at the step 186, the routine of FIGS. 4a and 4b advances to steps 188–192, to generate emissions estimates for the constituent emission elements of CO, HC, and NOx, using the four delta values applied to appropriate functions for mapping the delta values into each of the three emission values. The generating of the functions and the mapping of the emission event counts into emission estimates using such functions at the steps 188–192 may be carried out in the manner described for the steps 116–120 of the routine of FIG. 3b. However, rather than use the absolute count values applied to the functions as was done in the routine illustrated in FIG. 3b, the delta values are applied to the functions through operation of the routine of FIG. 4b to arrive at the emission estimates.

After estimating the CO level at the step 188, the HC level at the step 190, and the NOx level at the step 192 in the illustrated manner, the routine moves to a step 194, to output the count values and/or the estimates to the display, such as in the manner described in the previously described embodiment in accord with this invention at the step 122 of FIG. 3b. The routine then determines whether a data download request is pending at the step 196. In this embodiment, the data download request may be made by an authorized party charged with monitoring the emissions and/or the emissions producing events of the engine 10 (FIG. 1). For example, a technician at a public test station may request the data download during a periodic mandatory or voluntary inspection of the engine, to impose fees determined in proportion to the number of emissions producing events downloaded, or to the emissions estimates downloaded.

Returning to the step 196, if a request for a data download is pending, the routine moves to a step 198, to download the data, for example by sending in a conventional manner the total count values CTON, CTE, CTCS, and CTWS, the delta count values $\Delta$CT, $\Delta$E, $\Delta$CS, and $\Delta$WS, and the emissions estimates CO, HC, and NOX to the external analyzer 30 (FIG. 1) via a suitable communication link 18, such as a serial data link. After the data is downloaded at the step 198, the routine moves to a step 200, to re-initialize the count values for the next data gathering period, which may be defined as the period between data downloads. The initialization of the step 200 may be carried out by updating the old count values with the corresponding count values that were just downloaded, so that a new data gathering and display period will be defined as starting with the downloaded count values. Alternatively, the step 200 may be avoided entirely to preserve a total count of emissions impacting events on-board the vehicle. After reinitializing the old count values at the step 200, the present routine returns to the step 150, to begin again the monitoring of emissions impacting engine events and the resulting estimated emissions, as described.

The preferred embodiment for the purpose of explaining this invention is not to be taken as limiting or restricting the invention since many modifications may be made through the exercise of skill in the art without departing from the scope of the invention.

The embodiments of the invention in which a property or privilege is claimed are described as follows:

1. An automotive vehicle emissions indicating method in which a predetermined model defines a relationship between a predetermined set of engine events and levels of a predetermined set of engine emissions elements, comprising the steps of:
   periodically determining an occurrence of any of the predetermined set of engine events;
   accumulating the determined occurrences over a predetermined test period;
   estimating levels of each of the predetermined set of engine emissions elements by applying the accumulated determined occurrences to the predetermined model; and
   indicating the estimated levels.

2. The method of claim 1, further comprising the step of indicating the accumulated determined occurrences.

3. The method of claim 1, further comprising the steps of:
   detecting a download time; and
   downloading the accumulated occurrences for analysis off-board the vehicle upon detecting the download time.

4. The method of claim 1, wherein the predetermined set of engine emissions elements includes the emissions elements of carbon monoxide, hydrocarbons, and oxides of nitrogen.

5. The method of claim 1, wherein the predetermined set of engine events includes the event of a predetermined unit of engine operating time.

6. The method of claim 1, wherein the predetermined set of engine events includes engine cold start events.

7. The method of claim 1, wherein the predetermined set of engine events includes engine warm start events.

8. The method of claim 1, wherein the predetermined set of engine events includes engine fuel enrichment events.

9. The method of claim 1, wherein the predetermined set of engine emissions elements includes carbon dioxide.

10. The method of claim 1, further comprising the steps of:
    predicting variations in the relationship between the predetermined set of engine events and levels of the predetermined set of engine emissions elements; and
    updating the predetermined model in accord with the predicted variations.

11. A method of indicating emissions levels of an automotive vehicle internal combustion engine, comprising the steps of:
    defining a set of engine events the occurrence of which significantly impact engine emission levels;
    providing a predetermined set of functions, each of which maps occurrences of a corresponding one of the defined set to engine emissions levels;
    periodically detecting occurrence of any of the defined set of engine events over a test period;
    generating engine emission levels by applying the detected occurrences to the provided predetermined set of functions; and
    indicating the generated engine emissions levels.

12. The method of claim 11, wherein the indicating step indicates the generated engine emissions levels to a vehicle operator in a substantially real-time format.

13. The method of claim 11, wherein the defined set of engine events includes engine cold start events and engine warm start events.

14. The method of claim 11, wherein the defined set of engine events includes engine fuel enrichment events.

15. The method of claim 11, further comprising the steps of:
    storing the periodically detected occurrences;
    detecting a request to provide the stored occurrences for analysis off-board the vehicle; and
    providing the stored occurrences for analysis off-board the vehicle upon detecting the request.

16. The method of claim 15, further comprising the step of indicating the stored occurrences to a vehicle operator.

17. The method of claim 11, further comprising the steps of:
    storing the periodically detected occurrences;
    storing the generated engine emissions levels; and
    periodically outputting the stored occurrences and the stored levels to a display on-board the vehicle to update the display.

18. The method of claim 11, further comprising the step of updating the provided predetermined set of functions to reflect estimated changes in the relationship between the defined set of engine events and the engine emissions levels.

* * * * *